United States Patent
Bischof et al.

(10) Patent No.: US 7,099,893 B2
(45) Date of Patent: Aug. 29, 2006

(54) RECORDING APPLICATION USER ACTIONS FOR APPLICATION TESTING

(75) Inventors: Jörg Bischof, Muhlhausen (DE); Christian Cohrs, Sandhausen (DE); Christian Denkel, Karlsruhe (DE); Markus Dinkel, Walldorf (DE); Martin Kolb, Waghausel (DE)

(73) Assignee: SAP Aktiengesellschaft, Walldorf (DE)

( * ) Notice: Subject to any disclaimer, the term of this patent is extended or adjusted under 35 U.S.C. 154(b) by 336 days.

(21) Appl. No.: 10/186,460

(22) Filed: Jun. 28, 2002

(65) Prior Publication Data
US 2004/0002996 A1 Jan. 1, 2004

(51) Int. Cl.
*G06F 17/30* (2006.01)

(52) U.S. Cl. .................. 707/104.1; 709/220

(58) Field of Classification Search .......... 707/1, 707/2, 3, 5, 104.1, 101, 102; 710/1, 5, 12, 710/22, 317; 345/156, 157; 703/17, 21; 709/224, 227, 234; 717/106, 115, 122, 136; 715/500, 539, 842, 967
See application file for complete search history.

(56) References Cited

U.S. PATENT DOCUMENTS

| | | | | |
|---|---|---|---|---|
| 5,086,386 A | * | 2/1992 | Islam | 707/202 |
| 5,157,384 A | * | 10/1992 | Greanias et al. | 345/156 |
| 5,335,342 A | * | 8/1994 | Pope et al. | 714/38 |
| 5,392,386 A | * | 2/1995 | Chalas | 715/841 |
| 5,657,438 A | * | 8/1997 | Wygodny et al. | 714/1 |
| 5,781,720 A | * | 7/1998 | Parker et al. | 714/38 |
| 5,812,780 A | * | 9/1998 | Chen et al. | 709/224 |
| 6,099,317 A | * | 8/2000 | Bullwinkel et al. | 434/118 |
| 6,308,146 B1 | * | 10/2001 | La Cascia, Jr. et al. | 703/22 |
| 6,324,654 B1 | * | 11/2001 | Wahl et al. | 714/6 |
| 6,336,149 B1 | * | 1/2002 | Preston | 710/1 |
| 6,772,107 B1 | * | 8/2004 | La Cascia, Jr. et al. | 703/21 |

OTHER PUBLICATIONS

"Automatic Checking for Computer Terminal System Test Equipment," Apr. 1, 1980, IBM Technical Disclosure Bulletin, vol. 22, Issue 11, pp. 5119-5120.*

* cited by examiner

*Primary Examiner*—Jeffery Gaffin
*Assistant Examiner*—Hassan Mahmoudi
(74) *Attorney, Agent, or Firm*—Fish & Richardson P.C.

(57) ABSTRACT

Methods and apparatus, including computer program products, for recording user actions includes receiving information representing a sequence of individual software application input actions taken by a user with respect to a software application, and recording the sequence as a higher level entry.

25 Claims, 4 Drawing Sheets

RECORDING APPLICATION USER ACTIONS FOR APPLICATION TESTING

BACKGROUND

The present invention relates to recording application user actions.

Applications are used by computer systems, for example, to process (e.g., sort, filter, store) data. To ensure proper processing of the data, the applications are sometimes tested. In one approach to testing, known inputs are supplied to the application during execution to establish what the predicted proper outputs would be. Using these predicted outputs, another instance of the application running on a possibly different platform and running at any location may be tested by applying the same inputs to the other application and comparing the processed outputs to the predicted outputs. To determine known inputs and predicted outputs that are useful for such testing, applications may be monitored and user inputs and the resulting outputs collected. Once recorded, the user actions may be used as known inputs for testing, for example, updated or new versions of the application. Typically, a test tool is used to record the interactions of a user with an application. User interactions may be recorded by tracking messages generated by and for an operating system, such as Microsoft Windows. Low level messages such as key down, character N, key up, and so on may be considered together as the input by the user of the character N, rather than actually storing all of the low level messages.

SUMMARY OF THE INVENTION

The present invention provides methods and apparatus, including computer program products, for recording user actions includes receiving information representing a sequence of individual software application input actions taken by a user with respect to a software application, and recording the sequence as a higher level entry.

In general, in one aspect, the invention features a computer-implemented method for recording user actions includes receiving information representing a sequence of individual software application input actions taken by a user with respect to a software application, and recording the sequence as a higher level entry.

In general, in another aspect, the invention features a computer program product, tangibly embodied in an information carrier, for storing instructions, the computer program product being operable to cause data processing apparatus to receive information representing a sequence of individual software application input actions taken by a user with respect to a software application; and record the sequence as a higher level entry.

The invention can be implemented to include one or more of the following advantageous features. The higher level entry may be recorded at a level that may be a session level, a transaction level, a program level, a screen level, or an input field level. The individual software application input actions may include actions taken in a user interface associated with a client. The client may be associated with a server and the server may use the user input actions in connection with data processing. The server may use the user input actions in effecting transactions. The individual software application input actions may include keystrokes. A determination may be made when the end of a logical sequence of the individual software application input actions has occurred, and the higher level entry is associated with the logical sequence. Information about the state of a session between the client and the server may be recorded. Information about the data flow between the client and the server may be recorded. Information may be received representing a second sequence of individual software application input actions taken by a user with respect to a second software application, and the second sequence may be recorded as a higher level entry. The second sequence may be recorded at a higher logical level than the first sequence. The logical level at which each of the sequences are recorded is selectable by an administrator. Upon the launching of an additional software application, a determination may be made whether to also record an additional sequence of individual software application input actions taken by a user with respect to the additional software application.

The invention can be implemented to realize one or more of the following advantages. By filtering interactions between a user and an application, irrelevant user actions may be removed prior to recording the user actions. By removing these irrelevant user actions, the recorded user actions are more condensed and manageable. These condensed and more manageable recorded user actions reduce testing complexity by increasing the ease of data accessing by test personnel.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
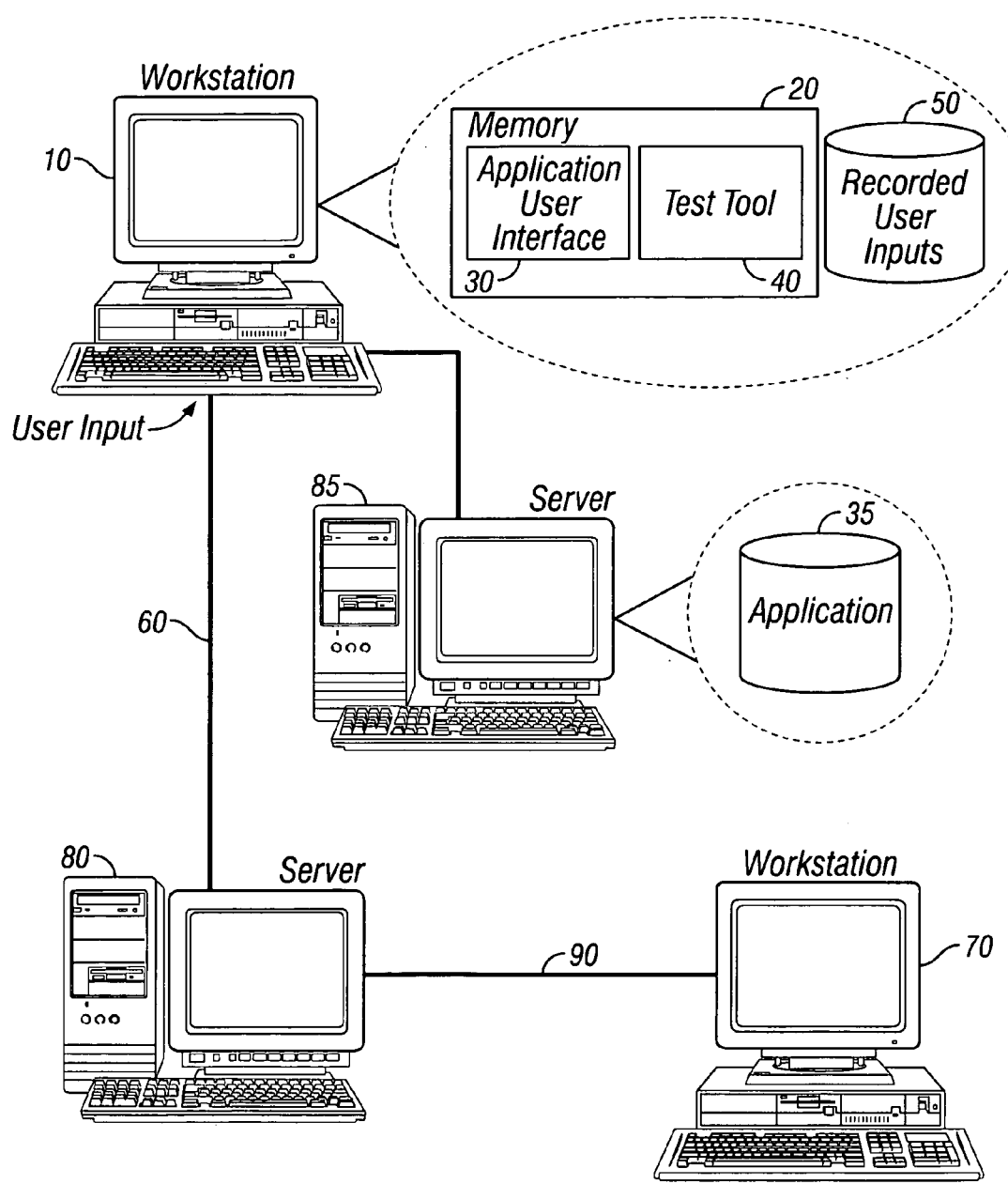
FIG. 1 is a block diagram of two workstations and two servers.

As shown in FIG. 1, a test tool 40 in accordance with the invention, executes in a memory 20 of a workstation 10 and may record user inputs to a software application user interface 30 that is provided by a client portion of an application 35, the server portion of which is running on a server 85. The test tool 40, for example, may collect, group, and record the user inputs for use in future testing of the software application 35 on the workstation 10 or another workstation 70. To test the software application 35, the recorded user inputs 50 may be sent over an Ethernet cable 60, for example, to a server 80 for storing and editing into test scripts. Later the test scripts can be used to generate feature calls that are sent over the Ethernet cables 60, or other Ethernet cables 90, to test the application 35 on each respective workstation 10, 70.

Figure 2A:
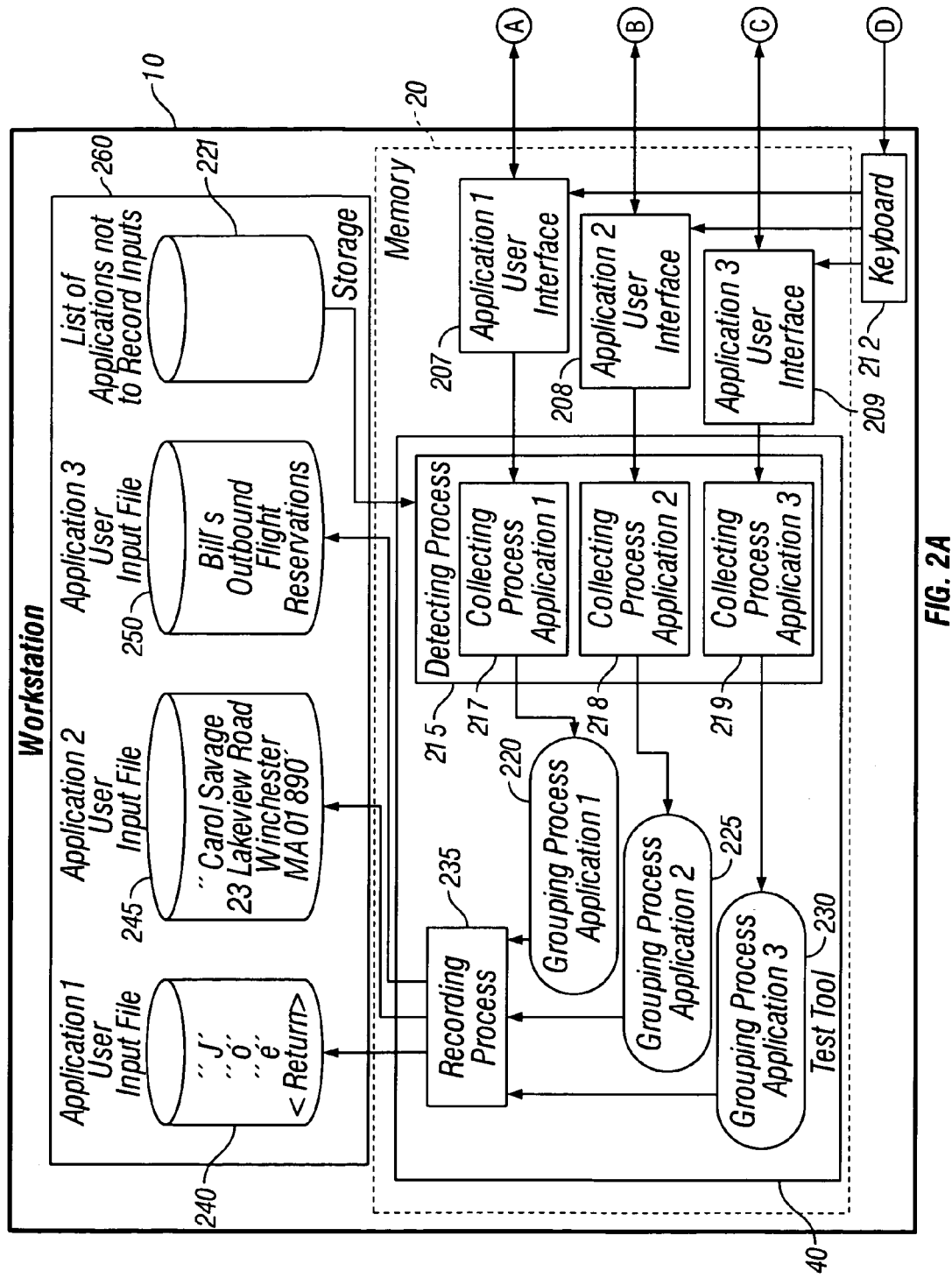
FIGS. 2A and 2B are a block diagram of three servers and a workstation containing a test tool.
Figure 2B:
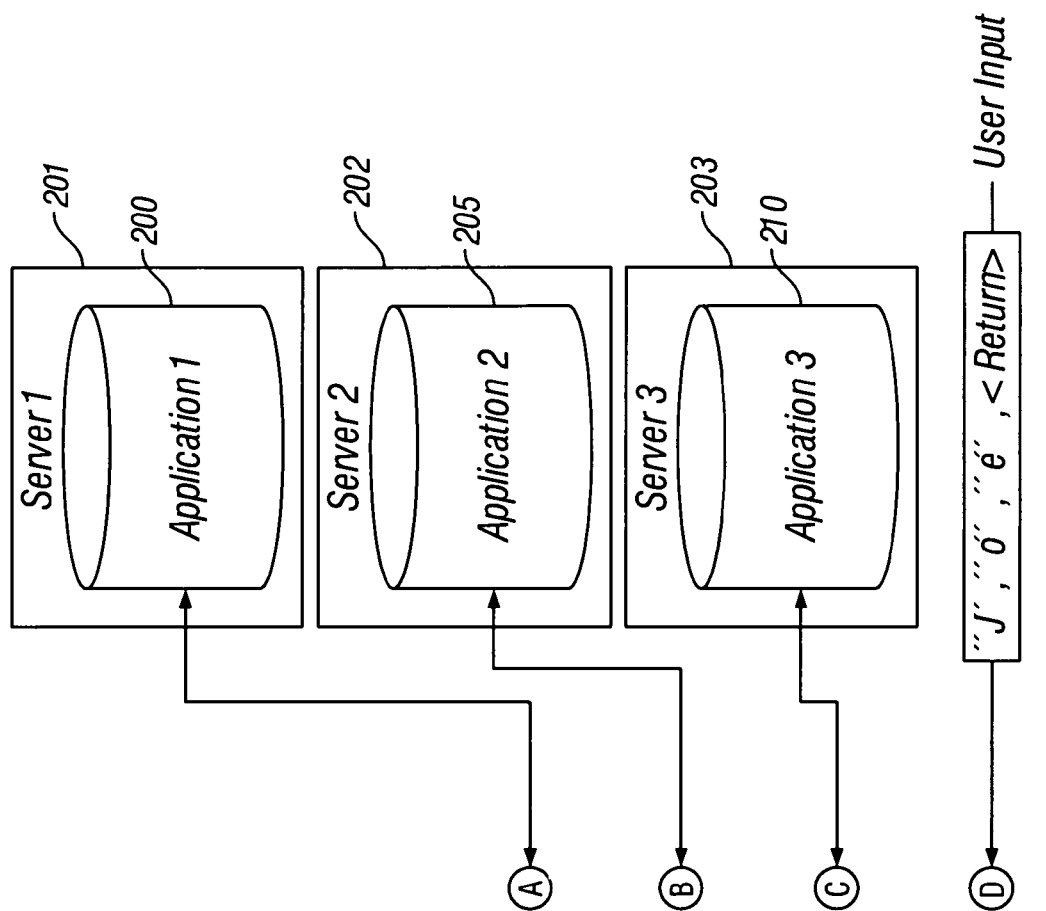

Referring to FIGS. 2A and 2B, a block diagram of the workstation 10 containing the test tool 40 residing in memory 20 and three servers 201, 202, 203 that are running three respective software applications 200, 205, 210 is shown. The test tool 40 includes a detecting process 215 that detects user inputs to three application user interfaces 207, 208, 209 of the client portions of the respective three applications 200, 205, 210 from, for example, a keyboard 212 (or, for example, a mouse, not shown). In some implementations, a test manager may assign the test tool 40 to collect user inputs to some of the application user interfaces and not other user interfaces. For example, prior to collecting user inputs to a user interface, the detecting process 215 may access a file 221, stored in workstation storage 260, which contains the names of applications whose inputs are not to be collected. However, in this particular example, the test tool 40 has assigned three collecting processes 217, 218, 219 to collect user inputs to the three respective application user interfaces 207, 208, 209.

Grouping processes 220, 225, 230 are interposed between the collecting processes 217, 218, 219 and a recording process 235 that records the respective user inputs into respective application user input files 240, 245, 250 in workstation storage 260 for transfer to the server 80 (shown in FIG. 1). Each grouping process 220, 225, 230 may be created and configured by a test manager and assigned to the respective applications 200, 205, 210 selected for recording user inputs for future testing. In this particular example, one grouping process 220 is created to process user inputs entered into the application 1 user interface 207, another grouping process 225 is created to process user inputs entered into application 2 user interface 208, and a third grouping process 230 is created to process user inputs entered into application 3 user interface 209. Correspondingly, in some implementations, as the number of applications selected for monitoring increases, the number of respective grouping processes increases.

The grouping processes 220, 225, 230 receive the user inputs collected by the respective collecting processes 217, 218, 219. The detecting process manages the job of assuring that each collecting process receives only the user inputs directed to the application user interface to which it is assigned. The individual user inputs received by a grouping process are grouped, for example, to remove irrelevant user inputs and reduce the size of the application user input files 240, 245, 250.

User inputs to an application may be considered to occur at several different levels of granularity and each of the grouping processes can be configured to group user inputs at a selected level. The bottom level of granularity is represented by groups of operating system messages, as mentioned earlier. For example, a series of messages may together represent a basic entry of a single character by a user.

At a next higher level, a sequence of user inputs may occur as a field entry. For example, suppose a user enters the characters JOE4 in a text field titled "first name" and tabs to the next field. The server may do error checking and conclude that JOE4 is not a proper first name and return an error message. Thus, the field entry could be the entry of JOE4 plus the tab key.

At a higher level, the user inputs could be accumulated at a screen level. At a screen level, a set of user inputs that relate to an interactive screen are accumulated and handled as a group. At a screen level the user inputs could include mouse clicks, dragging, text entry, and command keys all or which indicate, for example, a completion of a screen whose purpose is to receive a new address of an existing user account.

The next higher level, called the program level, includes all of the user actions associated with the completion of a user input routine that is part of a larger transaction. For example, a program grouping could relate to three screens that are designed to enable a user to complete the job of entering airline flight information for the outbound leg of a trip. Once that program is completed, the application may take the user to a second program that has three screens that deal with the inbound flight.

The next level up is the transaction level. A transaction is a set of user input that is delivered to the server (e.g., a database server) as a transaction to be committed to the database. The transaction grouping can encompass one or more than one program. For example, a transaction could be the entire set of user inputs required to commit an agreed itinerary to a database.

Above the transaction level is the session level which corresponds, for example, to a session between a user and the application from logon to logoff. The session could include multiple transactions.

It is also possible to group the user inputs according to the user input device that was the source of the inputs. For example, all keystroke inputs could be retained and all non-keyboard inputs could be discarded.

The test manager can configure each of the grouping processes to operate at any of the levels described above through a user interface (not shown). Once the user inputs are grouped and converted into higher level inputs, they may be stored in files 240, 245, and 250, as shown. In the example shown in FIGS. 2A, and 2B, inputs to application 1 are being stored at the individual keystroke level, inputs to application 2 are being stored at the screen level, and inputs to application 3 are being stored at the program level.

The grouping process uses various techniques to determine when it has reached the end of a group of user inputs that represent a higher level user input to be recorded. In the case of a field entry, the end of the sequence may be indicated by a message to the server indicating that the user has completed entry in a field. In the case of a screen level, the end of the sequence may be indicated when the user proceeds to a different screen. For the program level, the indication of the end of the program may be the invocation by the user of a particular button on the screen. For example, when the outbound flight information has been entered and checked for errors, the user may click a button labeled "outbound flight information completed". At the transaction level, when the client portion sends a message to the server with data and a command to commit the data to the database, the grouping process will know that the end of the transaction has been reached. The end of a session level can be detected based on logon and logoff information.

By recording the user inputs at different granularity levels the application user input files 240, 245, 250 may be condensed, more manageable, and tailored for future application testing.

In some implementations, the memory 20 may include multiple test tools that may be executed individually or in combination. For example, while one test tool may group and record user inputs at one level of granularity a second test tool may group and record the same user inputs at different levels of granularity. Also, by executing multiple test tools, each test tool may record user input files for the same or different applications.

Figure 3:
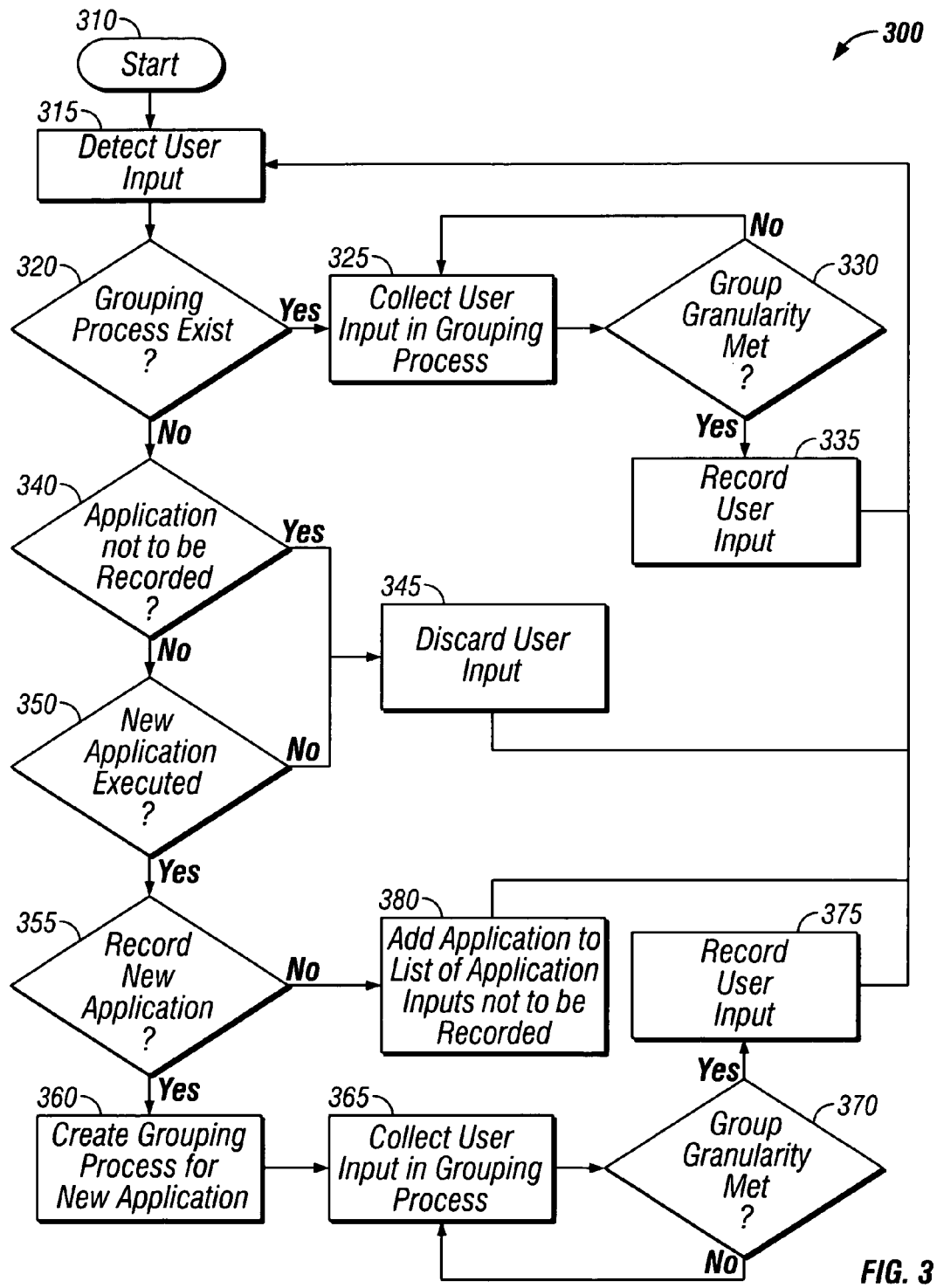
FIG. 3 shows a procedure for recording user inputs.

Referring to FIG. 3 a process 300 for recording user inputs is shown. The process starts 310 when the test tool 40 (shown in FIGS. 2A and 2B) detects 315 an input from a user into an executing application. The test tool determines 320 if the detected user input corresponds to an application with an assigned grouping process, contained in the test tool, which was created by the test manager. If the application has been assigned to a grouping process, the procedure 300 collects 325 the user input corresponding to the grouping process. Once collected, the procedure 300 determines 330 if the collected user input completes a group at the granularity level selected by the test manager for the grouping process. If the user input completes a group, the group is recorded 335 at the preselected level by the recording process 235 (shown in FIGS. 2A and 2B) and the procedure 300 returns to detecting 315 more user inputs. If the group is not completed at the selected granularity level, the procedure 300 collects 325 subsequently detected user inputs relating to the application until the group is complete.

If the test tool 40 does not include a grouping process for the particular application relating to the user inputs detected, the procedure 300 determines 340 if the application is listed in a file 221 (shown in FIGS. 2A and 2B) that contains a list of applications that are not to have inputs recorded. If the application is in the file, the procedure 300 discards 345 the detected user input and returns to listening for more user inputs 315. If the application is not in the file and no corresponding grouping process is present in the test tool 40, the procedure 300 determines 350 if the detected user input was entered into a newly executing application. If the application is not new, the user input is discarded 345 and the procedure 300 returns to detecting 315 more user inputs.

If a new application has been executed, the procedure 300 determines 355 whether to record user inputs relating to the new application. In some implementations, the test tool may open a dialog box that identifies the new application and queries the test manager whether or not to record user inputs to the new application.

If affirmatively answered, the test tool creates 360 a grouping process, with a particular granularity provided by the test manager for the new application and collects 365 the user input. Once collected, the procedure 300 checks 370 if the user input has completed a group at the selected granularity level. If the group is complete, the user input is recorded 375 in a corresponding application user input file and the procedure 300 returns to listening for more user inputs. If the group is not completed by the user input, the procedure 300 collects 365 subsequent user inputs relating to the new application until the group is completed.

If the test manager responds that user inputs relating to the new application are not to be recorded, the procedure 300 adds 380 an identifier of the new application to the file 221 containing the list of applications that do not have user inputs recorded. After entering the new application on the list 380, the procedure 300 returns to detecting 315 more user inputs.

When two applications for which user inputs are being recorded interact, additional provisions must be made during recording to assure that the recorded information correctly captures the data flow between each application client and server. For example, suppose the client of application 1 submits an updated employee address to the application 1 server, and a user of application 2, at about the same time, requests the address of the employee. In order to make effective use of the recorded user inputs for later testing of the two applications, it is important to track the states of the sessions of the applications at the times when the updated data is sent to the application 1 server. For this purpose, the grouping processes record user input not only at a preset high level of granularity, but they also record the flow of data (including timing and content, for example) from the application clients to the application servers in order to capture the server context at the time of user inputs. If this were not done, for example, in a case in which the inputs to the two applications were only being recorded at the transaction level, the recorded information would not indicate whether the change of address had been transmitted before or after the request for the address. Later testing with such limited information could not be done effectively.

Other implementations are also within the scope of the following claims.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In FIGS. 1, 2A, 2B, and 3, user inputs were collected, grouped, and recorded, however, other similar information representing interactions between a user and a software application may be recorded. Also, databases, electronic documents, or other similar storage mechanisms may be used to store the recorded user inputs. An electronic document does not necessarily correspond to a file. A document may be stored in a portion of a file that holds other documents, in a single file dedicated to the document in question, or in multiple coordinated files.

In FIG. 1, the test tool 40 and the application 30 resided in the memory 20 of the workstation 10, however, servers, computer systems, personal digital assistances, cell phones, or other similar digital devices may include a memory containing the test tool 40 and may be used to interact with a user.

In FIGS. 2A and 2B, user inputs entered into the applications 200, 205, 210 were recorded into separate files 240, 245, 250. However, in some implementations the recording process 235 may store user inputs for two or more of the applications 200, 205, 210 into a single file.

The invention has been described in terms of particular embodiments. Other embodiments are within the scope of the following claims. For example, the steps of the invention can be performed in a different order and still achieve desirable results.

What is claimed is:

1. A computer-implemented method comprising:
   detecting a first sequence of individual user inputs being made to a running instance of a first software application and providing the first sequence of individual user inputs to the running instance of the first software application;
   detecting a second sequence of individual user inputs being made to a running instance of a second software application and providing the second sequence of individual user inputs to the running instance of the second software application;
   grouping the first sequence of individual user inputs into a first sequence of input groups at a first granularity level;
   grouping the second sequence of individual user inputs into a second sequence of input groups at a second granularity level, the second granularity level being different from the first granularity level; and
   recording the first sequence of input groups and the second sequence of input groups.

2. The computer-implemented method of claim 1 in which the first granularity level is a keystroke level and the second granularity level is one of a session level, a transaction level, a program level, a screen level, or an input field level.

3. The computer-implemented method of claim 1 in which the first and second sequences of individual user inputs are each made in a respective user interface associated with a respective client.

4. The computer-implemented method of claim 3 in which each respective client is associated with a respective server that uses the respective individual user inputs in connection with data processing.

5. The computer-implemented method of claim 4 in which the respective servers use the respective sequences of individual user inputs in effecting transactions.

6. The computer-implemented method of claim 4, further comprising recording information about the state of a session between the client and the server.

7. The computer-implemented method of claim 4, further comprising recording information about the data flow between the client and the server.

8. The computer-implemented method of claim 1 in which the first and second sequences of individual user inputs include keystrokes.

9. The computer-implemented method of claim 1, wherein grouping a sequence of individual user inputs into a sequence of input groups at a respective granularity level comprises:
   determining when a user input completes a group at the respective granularity level.

10. The computer-implemented method of claim 1 further comprising receiving an administrator selection selecting the first granularity level and the second granularity level.

11. The computer-implemented method of claim 1 also including, upon launching of an instance of a third software application, determining whether to detect, group, and record additional individual user inputs being made to the instance of the third software application.

12. A computer program product, tangibly embodied in a machine-readable storage device, the computer program product being operable to cause data processing apparatus to:
   detect a first sequence of individual software application user inputs actions being made to a running instance of a first software application and provide the first sequence of individual user inputs to the running instance of the first software application;
   detect a second sequence of individual user inputs being made to a running instance of a second software application and provide the second sequence of individual user inputs to the running instance of the second software application;
   group the first sequence of individual user inputs into a first sequence of input groups at a first granularity level;
   group the second sequence of individual user inputs into a second sequence of input groups at a second granularity level, the second granularity level being different from the first granularity level; and
   record first sequence of input groups and the second sequence of input groups.

13. The computer program product of claim 12 in which the first granularity level is a keystroke level and the second granularity level is one of a session level, a transaction level, a program level, a screen level, or an input field level.

14. The computer program product of claim 12 in which the first and second sequence of individual user inputs are each made in a respective user interface associated with a respective client.

15. The computer program product of claim 14 in which each respective client is associated with a respective server that uses respective individual user inputs in connection with data processing.

16. The computer program product of claim 15 in which the respective servers use the respective sequences of individual user inputs in effecting transactions.

17. The computer program product of claim 15 wherein the computer program product is further operable cause data processing apparatus to record information about the state of a session between the client and the server.

18. The computer program product of claim 15, wherein the computer program product is further operable cause data processing apparatus to record information about the data flow between the client and the server.

19. The computer program product of claim 12 in which the first and second sequences of individual user inputs include keystrokes.

20. The computer program product of claim 12 wherein the computer program product is further operable to cause data processing apparatus to:
   determine when a user input completes a group at a respective granularity level.

21. The computer program product of claim 12 wherein the computer program product is further operable cause data processing apparatus to receive an administrator selection selecting the first granularity level and the second granularity level.

22. The computer program product of claim 12 wherein the computer program product is further operable to cause processing apparatus to determine, upon launching of an instance of a third software application, whether to detect, group, and record additional individual user inputs being made to the instance of the third software application.

23. A computer program product, tangibly embodied in a machine-readable storage device, the computer program product being operable to cause data processing apparatus to:
   collect first user inputs to a first user interface of a first software application while providing the first user inputs to the first software application;
   set a first level of granularity for grouping first user inputs at any one of:
      a keystroke level in which user inputs that relate to a single keystroke are accumulated and handled as a group,
      a input field level in which user inputs that relate to a single input field are accumulated and handled as a group, or
      a screen level in which user inputs that relate to a single interactive screen are accumulated and handled as a group;
   group first user inputs collected from the first user interface into one or more first groups at the first level of granularity; and
   record the one or more first groups into a first application user input file for future testing of the first software application.

24. The product of claim 23, wherein:
the first user interface is provided by a client portion of the first software application, the first software application having a server portion running on a server;
the first user inputs comprise inputs from a keyboard and a mouse; and
the product is further operable to set the first level of granularity to any one of:
   a multiple-screen level in which user inputs that relate to multiple interactive screens that together enable a user to complete a particular job are accumulated and handled as a group,
   a transaction level in which user inputs that are delivered to a server as a transaction to be committed are accumulated and handled as a group, or
   a session level in which user inputs to a session between the user and the first application are accumulated and handled as a group.

25. The product of claim 23, further being operable to cause data processing apparatus to:
   collect second user inputs to a second user interface of a second software application;
   set a second level of granularity for grouping second user inputs, the second level of granularity being different from the first level of granularity;
   group second user inputs collected from the second user interface into one or more second groups at the second level of granularity; and
   record the one or more second groups into a second application user input file for future testing of the second software application.

* * * * *